(12) United States Patent
Chen (10) Patent No.: US 9,355,462 B2
(45) Date of Patent: May 31, 2016

(54) MOTION ESTIMATION SYSTEM UTILIZING POINT CLOUD REGISTRATION

(71) Applicant: CATERPILLAR INC., Peoria, IL (US)

(72) Inventor: Qi Chen, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 314 days.

(21) Appl. No.: 13/889,855

(22) Filed: May 8, 2013

(65) Prior Publication Data

US 2014/0334685 A1  Nov. 13, 2014

(51) Int. Cl.
*G06K 9/00* (2006.01)
*G06T 7/20* (2006.01)

(52) U.S. Cl.
CPC ..... *G06T 7/2033* (2013.01); *G06T 2207/10016* (2013.01); *G06T 2207/10028* (2013.01)

(58) Field of Classification Search
None
See application file for complete search history.

(56) References Cited

U.S. PATENT DOCUMENTS

| 5,629,773 | A | 5/1997 | Wakai et al. | |
| 7,583,272 | B2 | 9/2009 | Ramani et al. | |
| 8,274,508 | B2 | 9/2012 | Porikli et al. | |
| 2008/0310757 | A1* | 12/2008 | Wolberg | G06K 9/00208 382/285 |
| 2012/0206438 | A1* | 8/2012 | Porikli | G06K 9/6214 345/419 |
| 2014/0334685 | A1* | 11/2014 | Chen | 382/107 |

OTHER PUBLICATIONS

Besl, J. P. et al., "A Method for Registration of 3-D Shapes," IEEE Transactions on Pattern Analysis and Machine Intelligence, Feb. 1992, p. 239-256, vol. 14, No. 2.
Chibunichev, A.G. et al., "Automatic Matching of Terrestrial Scan Data Using Orientation Histograms," The International Archives of the Photogrammetry, Remote Sensing and Spatial Information Sciences, vol. XXXVII, Part B5, Beijing 2008, p. 601-604.
Dold, C., "Extended Gaussian Images for the Registration of Terrestrial Scan Data," ISPRS WG III/3, III/4, V/3 Workshop "Laser scanning 2005," Enschede, the Netherlands, Sep. 12-14, 2005, p. 180-185.
Makadia, A. et al., "Fully Automatic Registration of 3D Point Clouds," Proceedings of the 2006 IEEE Computer Society Conference on Computer Vision and Pattern Recognition (CVPR'06), 9 pages.
Rusinkiewicz, S. et al., "Efficient Variants of the ICP Algorithm," In Proceedings of the 3$^{rd}$ Intl. Conf. on 3D Digital Imaging and Modeling, pp. 145-152, 2001.
"Automatic point cloud pre-alignement using orientation histograms," Graphics and Media Lab, http://graphics.cs.msu.ru/en/science/research/3dpoint/alignement.
"Iterative closest point," http://en.wikipedia.org.wiki/literative_closest_point.

* cited by examiner

*Primary Examiner* — Nancy Bitar
(74) *Attorney, Agent, or Firm* — Finnegan, Henderson, Farabow, Garrett & Dunner, LLP (57) ABSTRACT

A system and method of estimation motion of a machine is disclosed. The method may include determining a first point cloud and a second point cloud corresponding to an environment in a vicinity of the machine. The method may further include generating a first extended gaussian image (EGI) for the first point cloud and a second EGI for the second point cloud. The method may further include determining a first EGI segment based on the first EGI and a second EGI segment based on the second EGI. The method may further include determining a first two dimensional distribution for points in the first EGI segment and a second two dimensional distribution for points in the second EGI segment. The method may further include estimating motion of the machine based on the first and second two dimensional distributions.

14 Claims, 9 Drawing Sheets
(6 of 9 Drawing Sheet(s) Filed in Color)

MOTION ESTIMATION SYSTEM UTILIZING POINT CLOUD REGISTRATION

STATEMENT REGARDING FEDERALLY SPONSORED RESEARCH OR DEVELOPMENT

This invention was made under government sponsorship: NNJ10HB32A awarded by the National Aeronautics and Space Administration (NASA). The government has certain rights in the invention.

TECHNICAL FIELD

The present disclosure relates generally to a machine having a system for estimating motion and, more particularly, to a machine having a motion estimation system utilizing point cloud registration.

BACKGROUND

Machines such as, for example, dozers, motor graders, wheel loaders, wheel tractor scrapers, and other types of heavy equipment are used to perform a variety of tasks at a worksite. Autonomously and semi-autonomously controlled machines are capable of operating with little or no human input by relying on information received from various machine systems. For example, based on machine movement input, terrain input, and/or machine operational input, a machine can be controlled to remotely and/or automatically complete a programmed task. By receiving appropriate feedback from each of the different machine systems during performance of the task, continuous adjustments to machine operation can be made that help to ensure precision and safety in completion of the task. In order to do so, however, the information provided by the different machine systems should be accurate and reliable. The velocity and angular orientation (for example, yaw, pitch, and roll) of the machine are a few of such parameters, for which accuracy may be important for control of the machine and its operation.

Conventional machines typically utilize a navigation or positioning system to determine these parameters. Some conventional machines utilize a combination of one or more of Global Navigation Satellite System (GNSS) data, a Distance Measurement Indicator (DMI) or odometer measurement data, Inertial Measurement Unit (IMU) data, etc. to determine these parameters. Some machines utilize perception systems including 3D scanning devices to determine these parameters. The 3D scanning devices may be one or more of 3D LIDARs (light detection and ranging), flash LIDARS, and 3D cameras.

Machines that use 3D LIDARs scan their surrounding environment to obtain a series of 3D point clouds. The 3D LIDAR unit in such machines may include a plurality of light sources, such as lasers. Each laser may generate a laser beam which is directed at various points of a worksite. The LIDAR unit may further include one or more detector devices that receive the laser beams after reflection off of various points of worksite. Based on the time between generating the laser beam and receiving the reflected laser beam (referred to as time-of-flight measurements), the LIDAR unit may determine a distance to the corresponding point. In such a manner, the LIDAR unit may generate a 3D point cloud image representative of a part of worksite. Each data point in this 3D point cloud image may include a distance from the LIDAR unit to a detected point of worksite. Once a series of such 3D point clouds are obtained, different machine parameters such as yaw, roll, pitch, etc. may be obtained by aligning the different point clouds with one another.

Methods that align the different point clouds to determine displacement and orientation of the machine are typically referred to in the literature as registration methods. Assume that we have two point clouds (a first and second point cloud) of the same object. The only difference between the two point clouds is that one of them (the second point cloud) is transformed, either: rotated (rotated around the axis) or translated (moved along the axis), or both, with respect to the original/first point cloud. The goal or solution of a registration method is to be able to move the second point cloud in such a way as to negate the change (either the rotation or translation) it has undergone and bring it back to where the original/first point cloud is positioned. The amount of rotation or translation required to align the second point cloud with the first point cloud may provide the angular orientation and lateral displacement of the machine.

An exemplary point cloud registration method that may be used to align two point clouds is disclosed in "Fully Automatic Registration of 3D Point Clouds" by Makadia et al. The registration technique disclosed in the Makadia publication generates an Extended Gaussian Image (EGI) for each of the point clouds and aligns the point clouds using correlation between the EGIs.

Although the registration technique disclosed in the Makadia publication may be useful in aligning 3D point clouds, the disclosed registration technique has some drawbacks. For example, the registration technique of the Makadia publication may not be able to determine lateral displacement between the point clouds and hence, may not provide the ability to determine velocity of the machine. Further, the disclosed technique may be highly reliant on object characteristics and hence, may not be applicable when the detected objects are uniform in all directions, such as a ball.

The motion estimation system of the present disclosure is directed toward solving one or more of the problems set forth above and/or other problems of the prior art.

SUMMARY

In one aspect, the present disclosure is directed to a system for estimating motion of a machine. The system may include a perception sensor configured to generate a first point cloud and a second point cloud corresponding to an environment in a vicinity of the machine. The system may further include a controller in communication with the perception sensor, the controller configured to generate a first extended gaussian image (EGI) for the first point cloud and a second EGI for the second point cloud. The controller may be further configured to determine a first EGI segment based on the first EGI and a second EGI segment based on the second EGI. The controller may be further configured to determine a first two dimensional distribution for points in the first EGI segment and a second two dimensional distribution for points in the second EGI segment. The controller may be further configured to estimate motion of the machine based on the first and second two dimensional distributions.

In another aspect, the present disclosure is directed to a method of estimating motion of a machine. The method may include determining, by one or more computer processors, a first point cloud and a second point cloud corresponding to an environment in a vicinity of the machine. The method may further include generating, by the one or more computer processors, a first extended gaussian image (EGI) for the first point cloud and a second EGI for the second point cloud. The method may further include determining, by the one or more computer processors, a first EGI segment based on the first EGI and a second EGI segment based on the second EGI. The method may further include determining, by the one or more computer processors, a first two dimensional distribution for points in the first EGI segment and a second two dimensional distribution for points in the second EGI segment. The method may further include estimating, by the one or more computer processors, motion of the machine based on the first and second two dimensional distributions.

In yet another aspect, the present disclosure is directed to a non-transitory computer-readable storage device storing instruction for enabling a processor to execute a method of estimating motion of a machine. The method may include determining a first point cloud and a second point cloud corresponding to an environment in a vicinity of the machine. The method may further include generating a first extended gaussian image (EGI) for the first point cloud and a second EGI for the second point cloud. The method may further include determining a first EGI segment based on the first EGI and a second EGI segment based on the second EGI. The method may further include determining a first two dimensional distribution for points in the first EGI segment and a second two dimensional distribution for points in the second EGI segment. The method may further include estimating motion of the machine based on the first and second two dimensional distributions.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
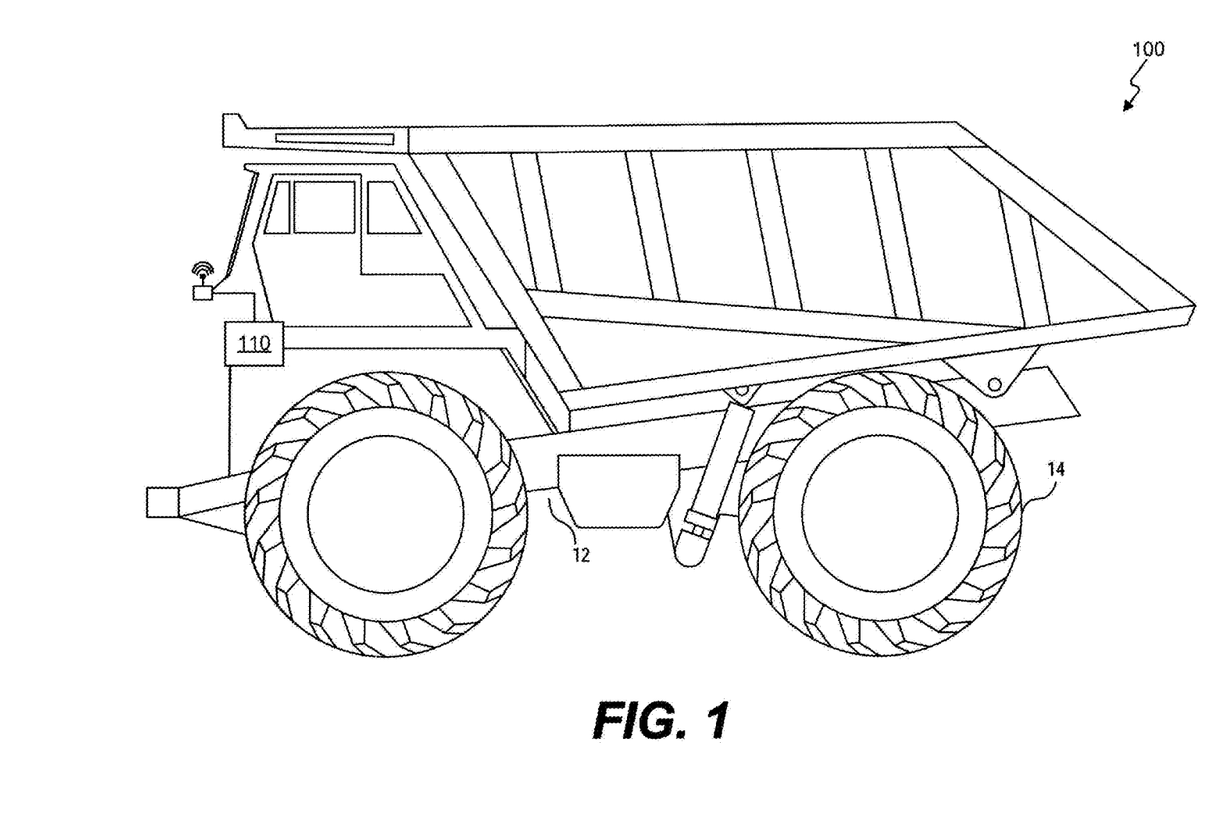
FIG. 1 is a pictorial illustration of an exemplary disclosed machine.

FIG. 1 illustrates a machine 100 having an exemplary disclosed motion estimation system 110. The machine 100 may be configured to perform some type of operation associated with an industry such as mining, construction, farming, transportation, power generation, or any other industry known in the art. For example, machine 100 may be an earth moving machine such as a haul truck, a dozer, a loader, a backhoe, an excavator, a motor grader, a wheel tractor scraper or any other earth moving machine. Machine 100 may generally include a frame 12 that at least partially defines or supports an operator station, one or more engines mounted to the frame, and a plurality of traction devices 14 driven by the engine to propel machine 100. The traction devices 14, in the disclosed exemplary embodiments, are wheels located at opposing sides of machine 100. Each traction device 14 may be independently driven to turn machine 100 or simultaneously and independently driven to propel machine 100 in a straight direction. It is contemplated that one or all of traction devices 14 may be replaced with another type of traction device, if desired, such as belts or tracks.

Figure 2:
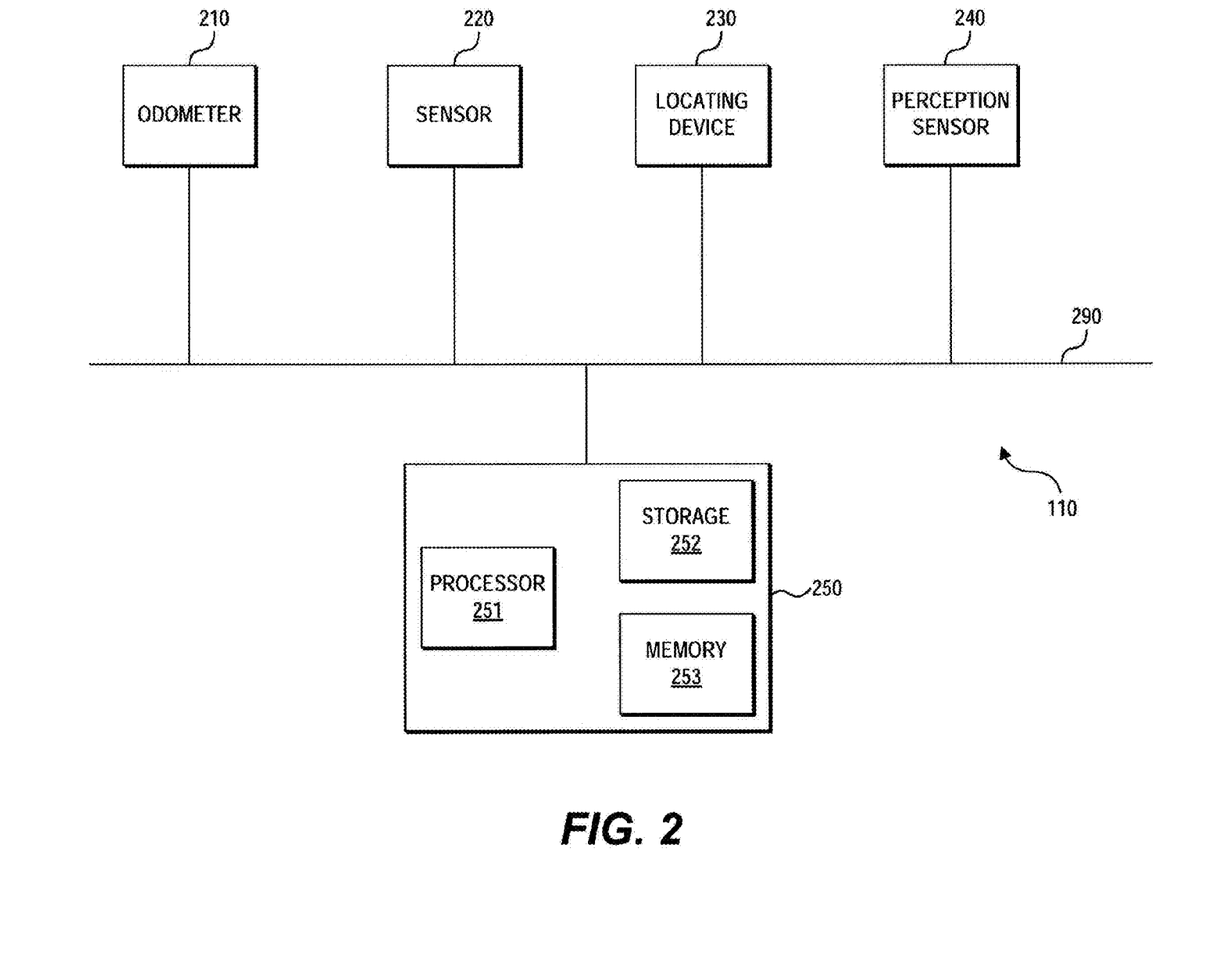
FIG. 2 is a diagrammatic illustration of an exemplary disclosed motion estimation system that may be used in conjunction with the machine of FIG. 1.

FIG. 2 illustrates an exemplary embodiment of the motion estimation system 110. The motion estimation system 110 may include an odometer 210, a sensor 220, a locating device 230, a perception sensor 240, and a controller 250. The above devices and controller 250 may be connected to each other via a bus 290. While a bus architecture is shown in FIG. 2, any suitable architecture may be used, including any combination of wired and/or wireless networks. Additionally, such networks may be integrated into any local area network, wide area network, and/or the Internet.

Odometer 210 may provide a signal indicative of a distance traveled by machine 100. Odometer 210 may provide as the signal, a measurement of number of rotations of the traction device 14 (such as a wheel 14). Odometer 210 may also provide, as the signal indicative of a distance traveled by machine 100, a measurement of number of rotations of a member of the machine 100's drive train. For example, odometer 210 may provide a measurement of number of rotations of an axle of machine 100.

Sensor 220 may include any device capable of providing angular rates of machine 100. For example, sensor 220 may include any device (such as a gyroscope) capable of measuring a yaw rate of the machine 100, and producing a corresponding yaw rate signal. Sensor 220 may also include a device (such as a gyroscope) capable of measuring a pitch rate of machine 100, and producing a corresponding pitch rate signal. Sensor 220 may further include a device (such as a gyroscope) capable of measuring a roll rate of machine 100, and producing a corresponding roll rate signal. Exemplarily, sensor 220 may include a single IMU including 3-axis angular rate gyros that provide signals indicative of the pitch rate, yaw rate, and roll rate of machine 100.

Locating device 230 may include any device capable of providing a signal that indicates machine 100's location. For example, locating device 230 could embody, a global satellite system device (e.g., a Global Positioning System (GPS) or Global Navigation Satellite System (GNSS) device), or any other known locating device.

Perception sensor 240 may include a laser range finding device. In the exemplary embodiments discussed herein, perception sensor 240 may include a 3D LIDAR unit that may include a plurality of light sources, such as lasers. Each laser may generate a laser beam which is directed at various points of a worksite. The LIDAR unit may further include one or more detector devices that receive the laser beams after reflection off of various points of worksite. Based on the time between generating the laser beam and receiving the reflected laser beam (referred to as time-of-flight measurements), the LIDAR unit may determine a distance to the corresponding point. In such a manner, the LIDAR unit may generate a 3D point cloud image representative of a part of worksite. Each data point in this 3D point cloud image may include a distance from the LIDAR unit to a detected point of worksite. However, it will be understood by one of ordinary skill in the art that the disclosed exemplary embodiments could be modified to utilize other 3D scanning devices. It will be further understood that odometer 210, sensor 220, and locating device 230 are optional and may not be present in machine 100 in accordance with certain embodiments.

Controller 250 may include processor 251, storage 252, and memory 253, included together in a single device and/or provided separately. Processor 251 may include one or more known processing devices, such as a microprocessor from the Pentium™ or Xeon™ family manufactured by Intel™, the Turion™ family manufactured by AMD™, any of various processors manufactured by Sun Microsystems, or any other type of processor. Memory 253 may include one or more storage devices configured to store information used by controller 250 to perform certain functions related to disclosed embodiments. Storage 252 may include a volatile or nonvolatile, magnetic, semiconductor, tape, optical, removable, nonremovable, or other type of storage device or computer-readable medium. Storage 252 may store programs and/or other information, such as information related to processing data received from one or more sensors, as discussed in greater detail below.

In one embodiment, memory 253 may include one or more motion estimation programs or subprograms loaded from storage 252 or elsewhere that, when executed by processor 251, perform various procedures, operations, or processes consistent with the disclosed embodiments. For example, memory 253 may include one or more programs that enable controller 250 to, among other things, collect data from one or more of odometer 210, sensor 220, locating device 230, and perception sensor 240, process the data according to disclosed embodiments such as those embodiments discussed with regard to FIGS. 2-9, and estimate motion of machine 100 based on the processed data.

In certain exemplary embodiments, controller 250 (and more particularly, the processor 251) may begin executing a process of motion estimation. Exemplarily, controller 250 may receive from perception sensor 240 a series of 3D point clouds. Two exemplary point clouds are illustrated in the top half of FIG. 3. Each of the points in the point clouds may have a corresponding x, y, and z coordinate. The 3D point clouds may correspond to the position of machine 100 at different times. For example, in FIG. 3, the white points may correspond to a first 3D point cloud generated at time t1 and the red points may correspond to a second 3D point cloud generated at time t2. Controller 250 may utilize a registration technique to align the second 3D point cloud with the first 3D point cloud and in the process determine lateral displacement and angular orientation of machine 100. An exemplary registration technique executed by controller 250 is described next.

Figure 3:
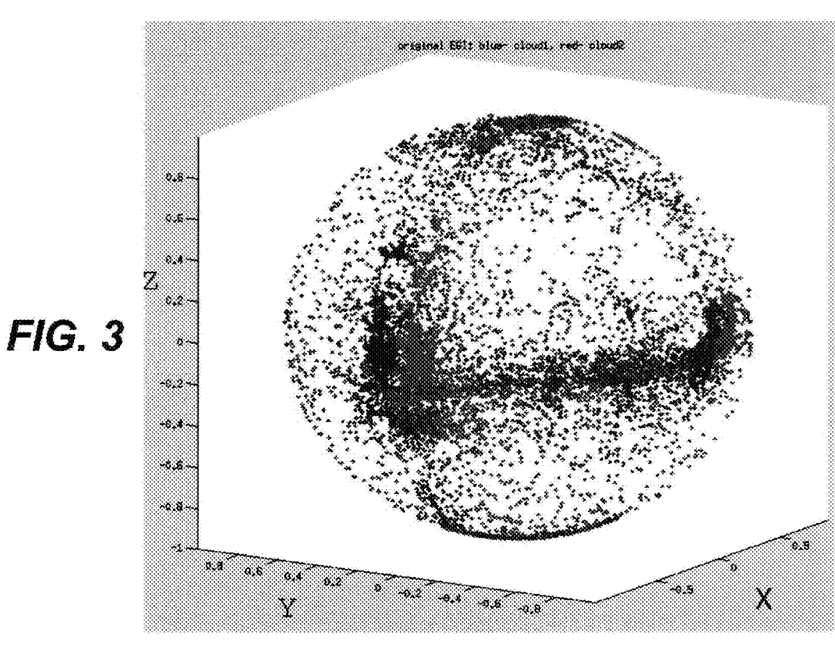
FIG. 3 is a diagrammatic illustration of two 3D point clouds and their respective EGIs.

Controller 250 may generate an Extended Gaussian Image (EGI) for each of the first and second point clouds. To generate the EGI for a given point cloud, controller 250 may determine the norm for each point in the point cloud. The norm may specify the direction of the point in terms of a unit vector. Methods for determining EGI are well known and software libraries (for example, point cloud library) that can generate an EGI for a point cloud are readily available. Any method for determining EGI may be used for purposes of the present disclosure. For the first point cloud (white point cloud) and the second point cloud (red point cloud), an EGI may be calculated as shown in the lower half of FIG. 3. The blue points represent the norm of the points in the first point cloud and the red points represent the norm of the points in the second point cloud. It will be understood that each point in the first and second EGI may have a one-to-one correspondence with the points in the first and second point clouds. Also, while FIG. 3 illustrates two EGIs (one for the first point cloud and one for the second point cloud together) in a single space, it will be understood that the EGIs may be calculated separately. For ease of reference, the EGI (blue points) corresponding to the first point cloud will be hereinafter referred to as the first EGI and the EGI (red points) corresponding to the second point cloud will be referred to as the second EGI.

Having calculated the first and second EGIs, controller 250 may calculate a segment for each of the first and second EGIs. For ease of reference, a segment of the first EGI will be referred to as the first EGI segment and a segment of the second EGI will be referred to as the second EGI segment. A segment may refer to a subset of the points in the first and second EGIs that may be determined by filtering the points in the EGIs using some criteria. For example, each of the first and second EGIs may be filtered using a criteria such as $$-0.2<z<0.2 \qquad (1)$$

Figure 4:
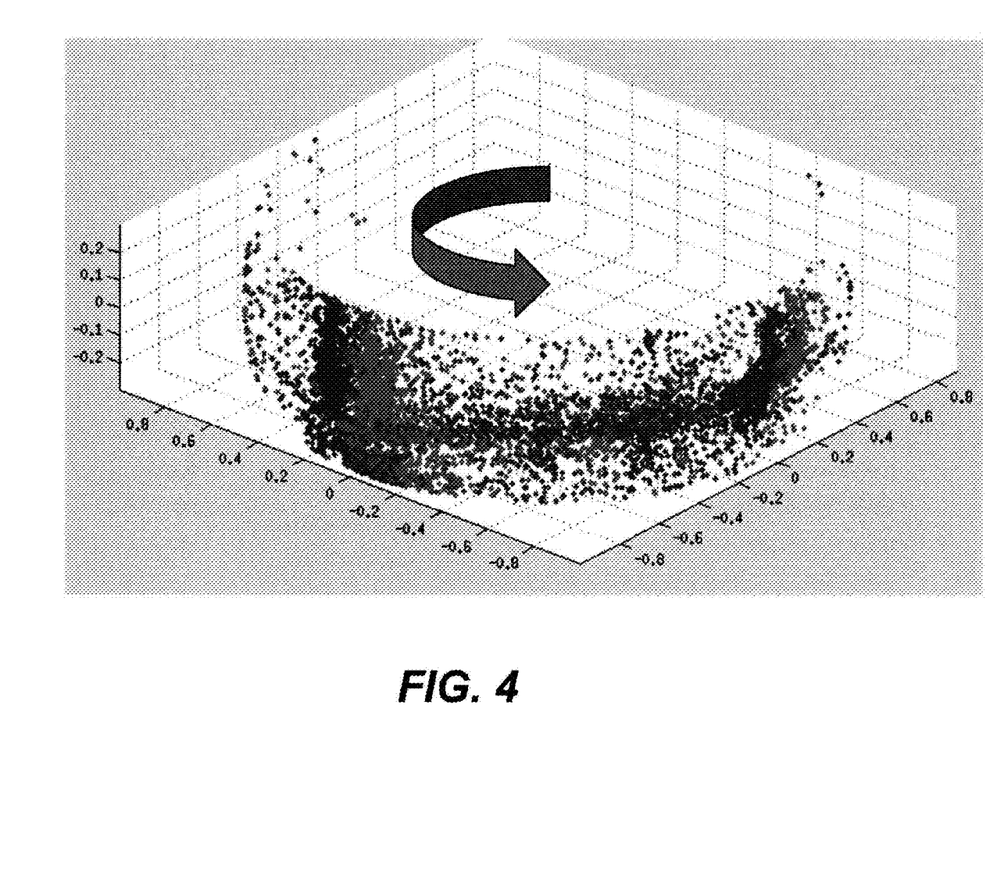
FIG. 4 is a diagrammatic illustration of EGI segments corresponding to the EGIs of FIG. 3.

All points in the EGI cloud that do not satisfy this condition may be filtered out to generate segmented EGI. Exemplary EGI segments generated by filtering the first and second EGIs using condition (1) are shown in FIG. 4. The EGI segments obtained by limiting the "z" coordinate may be helpful in determining yaw of machine 100. As points near the north pole and south pole of the EGI cloud correspond to horizontal surfaces, they may not possess useful information for purposes of calculating yaw, and the displacement in the x and y directions. Accordingly, points near the north and south pole may be filtered out for purposes of calculating yaw using a criteria such as criteria (1). It will be noted that −0.2 and 0.2 are only exemplary values and any other values may be used. For example, in some embodiments, a different criteria such as $-0.3<z<0.3$ or $-0.45<z<0.2$ may be used.

Having calculated the first and second EGI segments, controller 250 may project each of the points therein onto a 2D plane. Exemplarily, for each point in an EGI segment, controller 250 may determine the corresponding point in the first or second 3D point cloud illustrated in FIG. 3. For example, controller 250 may determine for each point in the first EGI segment, the corresponding point in the first point cloud (top half of FIG. 3). Similarly, for each point in the second EGI segment, controller 250 may determine the corresponding point in the second point cloud (top half of FIG. 3). Having located the corresponding points in the first or second point clouds, controller 250 may retrieve the x, y, and z coordinates for those points in the first and second point clouds. By ignoring the z coordinates for those points, each of the points may be projected onto an X-Y 2D plane based on their respective x and y coordinates. For example, if a certain point in the first EGI segment has a corresponding point (x=16, y=19, z=20) in the first point cloud, the point may be mapped onto the 2D plane with coordinates (16, 19). An exemplary projection is illustrated in FIG. 5 where the blue points are points from the white/first point cloud and the red points are from the red/second point cloud.

Next, controller 250 may determine a distribution map for each of the first and second EGI segments. Exemplarily, controller 250 may generate an N×M grid with each grid point as a bin or bucket. Here, N and M may be any integer. For example, N may be specified as −100<N<100 and M may be specified by −100<M<100. It will be understood that '100' and '−100' are simply examples and any integer limit may be put on N and M. Having generated the N×M grid, controller 250 may distribute each of the points in the 2D plane (FIG. 5) across the N×M grid. It will be understood that two separate distribution maps may be generated based on the above. To distribute a point present in the 2D plane, controller 250 may determine the x and y coordinates of the point in the 2D plane illustrated in FIG. 5. Each point from the 2D plane may be assigned a value of 1 and this value may be distributed across the different buckets or grid points based on the x and y coordinates of the point as shown in FIG. 6 and described next.

Figure 5:
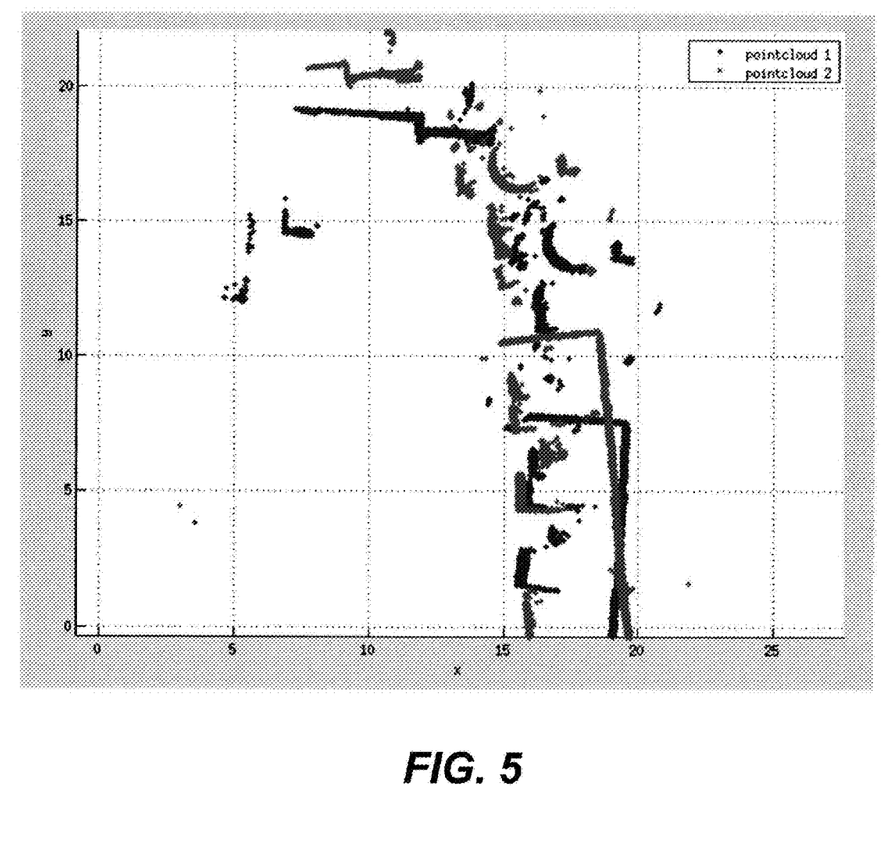
FIG. 5 is a diagrammatic illustration of a projection of the EGI segments onto a 2D plane.
Figure 6:
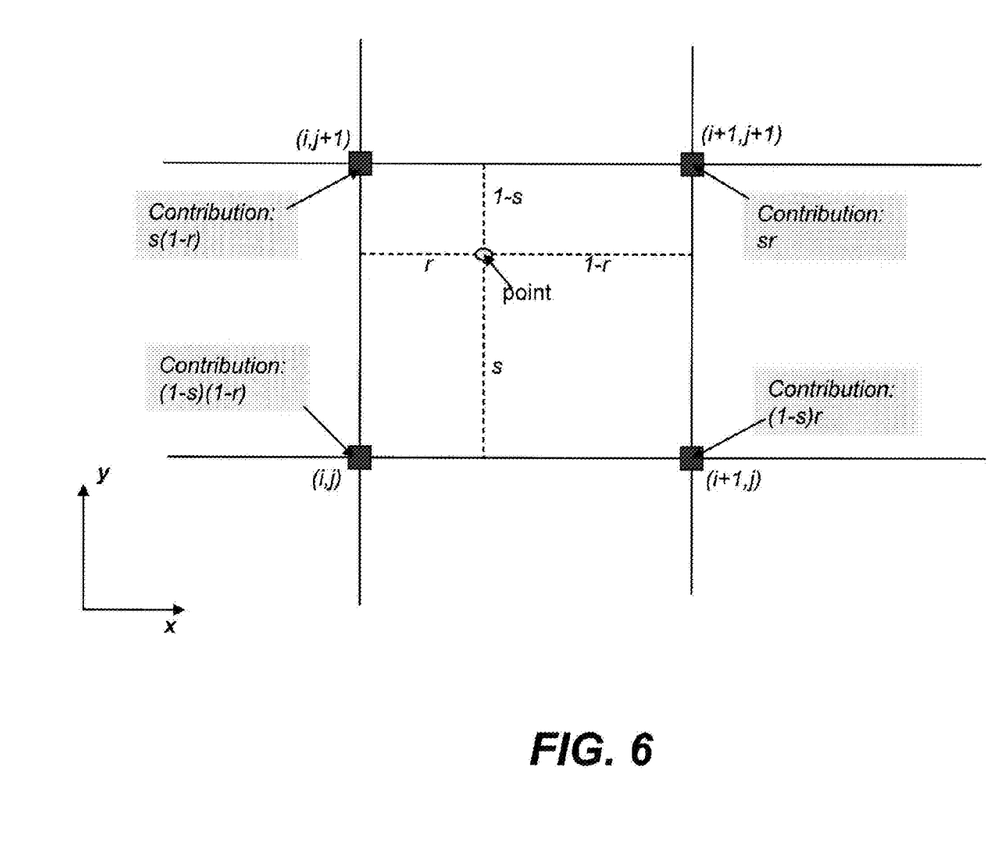
FIG. 6 is a diagrammatic illustration of a grid used to build a distribution map for the points in the EGI segments.
Figure 7:
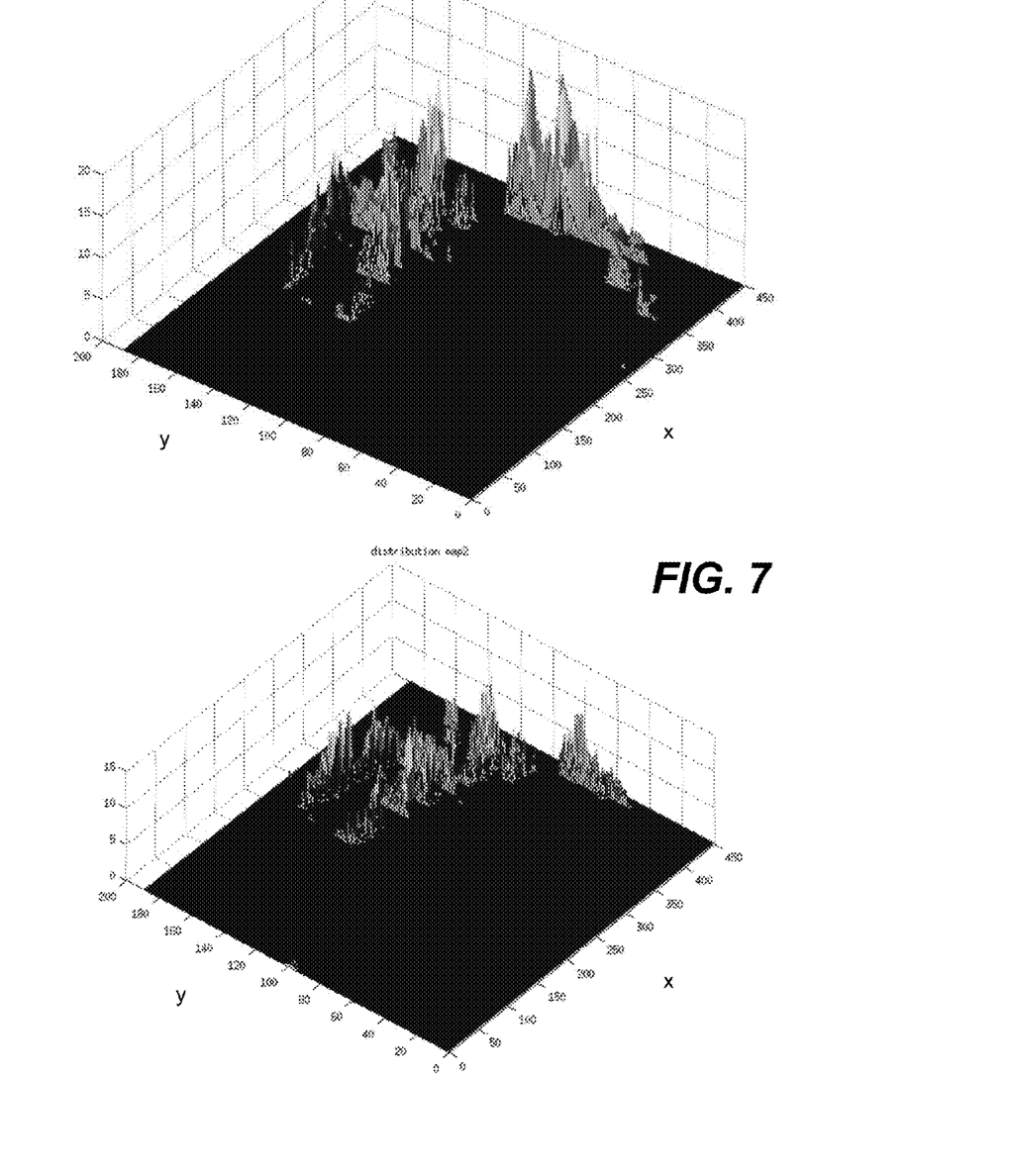
FIG. 7 is a diagrammatic illustration of distribution maps for the EGI segments.

For example, consider a point in the 2D plane of FIG. 5 that has x and y coordinates (1.5, 1.5). Such a point will be surrounded by 4 grid points (1,1), (1,2), (2,1), and (2,2). As the point (1.5,1.5) is equidistant to the lines connecting these 4 grid points, its value ('1') may be equally distributed amongst the 4 grid points such that each of the 4 grid points get a value of '0.25'. FIG. 6 illustrates how the value ('1') for each point is distributed across the neighboring 4 grid points based on distance 's' and 'r.' Controller 250 may distribute each point in the 2D plane as discussed above to generate two distribution maps, one for the first EGI segment and one for the second EGI segment. In other words, to generate a distribution map for the first EGI segment, controller 250 may distribute all the blue points from the 2D plane of FIG. 5 across the grid. To generate a distribution map for the second EGI segment, controller 250 may distribute all the red points from the 2D plane of FIG. 5 across the grid. Exemplary distribution maps (first distribution map and second distribution map) are illustrated in FIG. 7 for the first and second EGI segments. These maps show the final value or weight (see z-axis) of each grid point on the distribution map once all the points in the first and second EGI segments are distributed.

Figure 8:
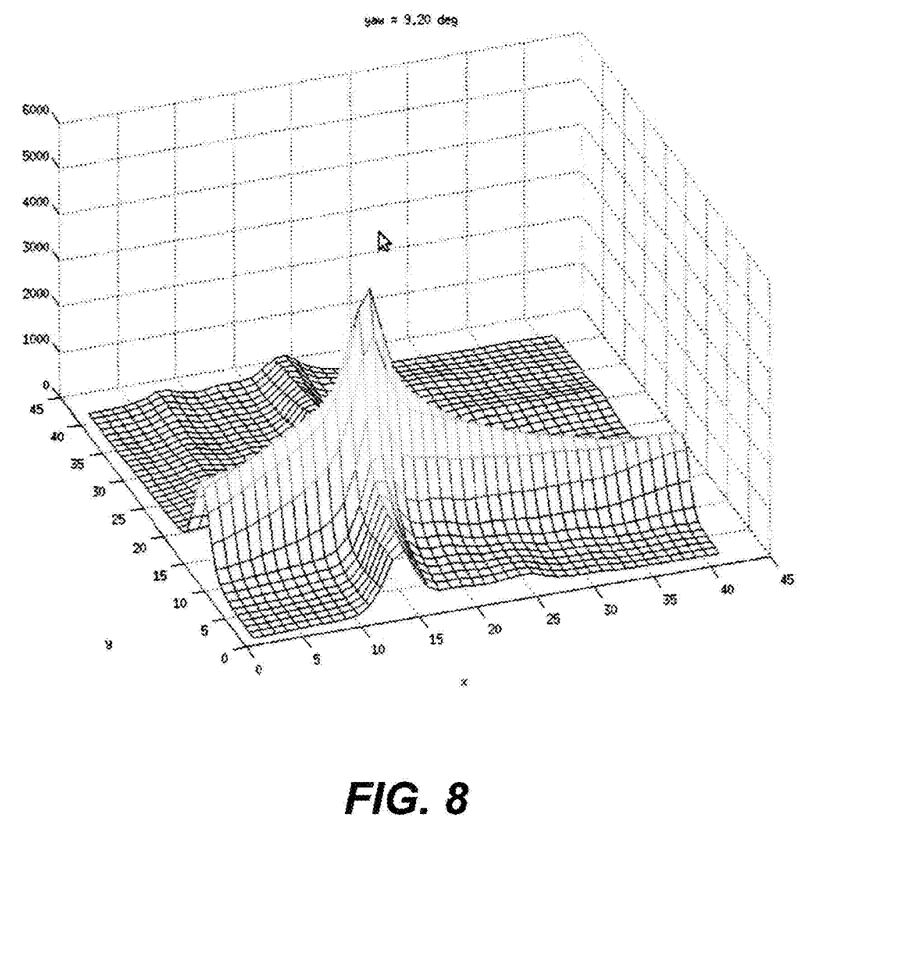
FIG. 8 is a diagrammatic illustration of a correlation map.

Having calculated the first and second distribution maps for the first and second EGI segments, respectively, controller 250 may determine a correlation between the distribution maps over a plurality of rotations. For example, controller 250 may rotate the second distribution map by a predetermined value (in degrees). Next, controller 250 may take a correlation between the rotated second distribution map and the first distribution map. The correlation may be obtained using a known method such as a Fast Fourier Transform (FFT). Controller 250 may then shift the rotated second distribution map laterally by, for example, shifting the x and y coordinates of the rotated second distribution map. Controller 250 may again determine a correlation between the shifted map and the first distribution map. Controller 250 may then again shift the x and y coordinates of the rotated distribution map and take another correlation. By iterating this process, for a given rotation value, controller 250 may determine a correlation map that maps correlation values with the amount of lateral shift. An exemplary correlation map is shown in FIG. 8. In the correlation map of FIG. 8, the x and y coordinates refer to the amount of shift for the rotated second distribution map. In the correlation map, the z-axis denotes the correlation value for any given lateral shift.

Next, controller 250 may rotate the original second distribution map by another rotation value and determine a corresponding correlation map for the rotation value as discussed above. Accordingly, controller 250 may determine a plurality of correlation maps for a plurality of rotation values. Next, controller 250 may determine the correlation map with the highest correlation value. The rotation value corresponding to the correlation map with the highest correlation value may provide the yaw for machine 100. For example, the correlation map of FIG. 8 corresponds to a rotation of 9.2 degrees, which controller 250 may determine as the yaw of machine 100. The x and y coordinate, scaled by an appropriate scaling value, of the location of the peak in the selected correlation map may provide the lateral displacement of machine 100 in the x and y directions. By utilizing the lateral displacement, controller 250 may determine the velocity of machine 100 based on the time difference between the first point cloud and the second point cloud, which is known to controller 250. Further, by utilizing the rotation degree (for example, 9.2 degrees above), controller 250 may determine yaw rate of machine 100 based on the time difference between the first point cloud and the second point cloud.

While the above discussion focused on determining yaw and displacement in the x and y directions, controller 250 may determine the roll and pitch of machine 100 in a similar manner. For example, to determine pitch, controller 250 may determine the first and second EGI segments by filtering using 'y' threshold values as opposed to 'z' threshold values. An exemplary filtering criterion may be −0.2<y<0.2. Having determined the first and second EGI segments, controller 250 may project the points in the EGI segments onto a 2D plane using the x and z coordinate values of the points from the first and second point clouds. That is, instead of creating a 2D map using x and y coordinate values as shown in FIG. 5, controller 250 may create a 2D map using x and z coordinate values. Similarly, the first and second distribution maps be generated using the x and z coordinate values as opposed to x and y coordinate values. With respect to rotation of the distribution maps, the x and z coordinates may be shifted to determine correlation maps for different rotation values. Like the calculation for yaw, the rotation corresponding to the highest correlation value may correspond to the pitch. For calculating roll, a similar process may be followed except that the filtering criterion would be based on the x coordinate, and the y and z coordinate values may be used for the 2D planes and subsequent steps.

Figure 9:
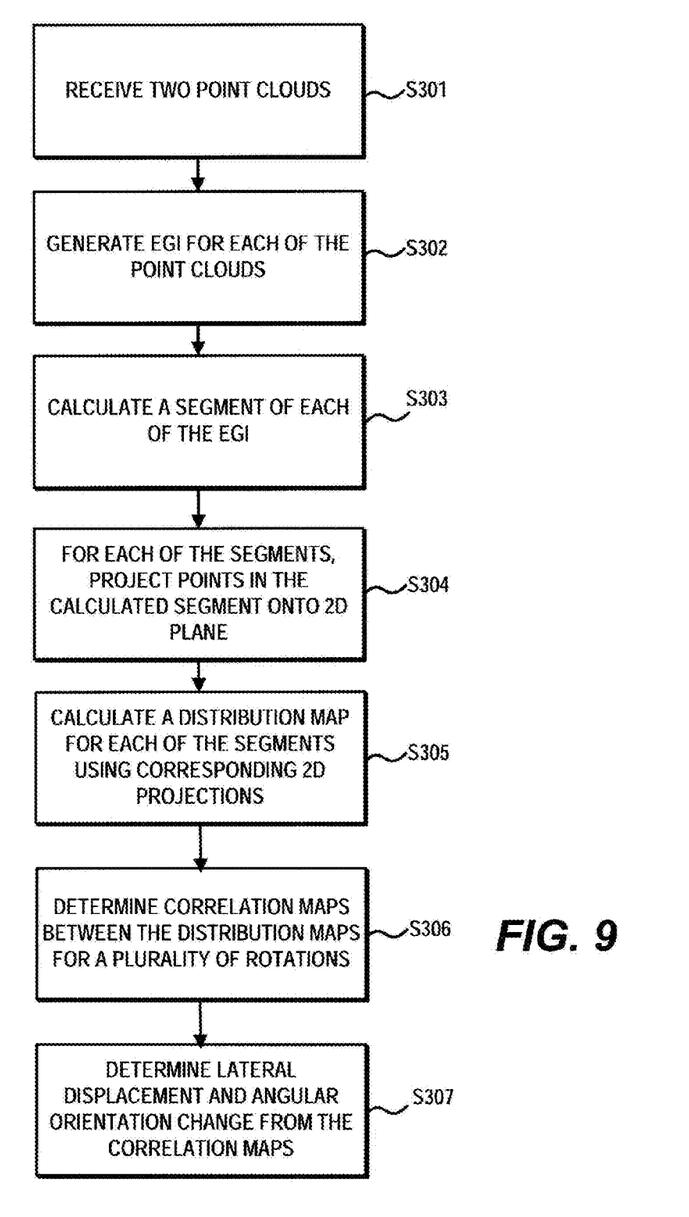
FIG. 9 is a flowchart depicting an exemplary disclosed method performed by the motion estimation system of FIG. 2.

FIG. 9 illustrates an exemplary processes implemented by the controller 250 for motion estimation. A detailed description of FIG. 9 is provided in the next section.

INDUSTRIAL APPLICABILITY

The disclosed motion estimation system 110 may be applicable to any machine where motion estimation is desired. The disclosed motion estimation system 110 may provide a faster and more accurate registration technique for 3D point clouds in comparison with prior art techniques. Operation of the motion estimation system 110 will now be described in connection with the flowchart of FIG. 9.

In S301, controller 250 (and more particularly, processor 251) may receive two or more point clouds from perception sensor 240. Exemplary first and second point clouds are illustrated in FIG. 3 (top half). The 3D point clouds may correspond to the position of machine 100 at different times. For example, in FIG. 3, the white points may correspond to a first 3D point cloud generated at time t1 and the red points may correspond to a second 3D point cloud generated at time t2. As discussed earlier, controller 250 may utilize a registration technique to align the second 3D point cloud with the first 3D point cloud and in the process determine lateral displacement and angular orientation of machine 100. The registration technique is described with reference to S302 thru S307.

In S302, controller 250 may generate an Extended Gaussian Image (EGI) for each of the first and second point clouds. As discussed earlier with reference to FIG. 3, to generate the EGI for a given point cloud, controller 250 may determine the norm for each point in the point cloud. As discussed earlier, the blue points in the lower half of FIG. 3 represent the first EGI of the first point cloud and the red points in the lower half of FIG. 3 represent the second EGI of the second point cloud.

Having calculated the first and second EGIs in S302, controller 250 may proceed to S303 and calculate a segment for each of the first and second EGIs. A segment may refer to a subset of the 3D points in the first and second EGIs that may be determined by filtering the points in the EGIs using some criteria (for example, criteria of condition (1) above). All points in the EGI cloud that do not satisfy this condition may be filtered out to generate segmented EGI. Exemplary EGI segments generated by filtering the first and second EGIs using condition (1) are shown in FIG. 4.

Having calculated the first and second EGI segments in S303, controller 250 may project each of the points therein onto a 2D plane in S304. Exemplarily, for each point in an EGI segment, controller 250 may determine the corresponding point in the first or second point cloud illustrated in FIG. 3. For example, controller 250 may determine for each point in the first EGI segment, the corresponding point in the first 3D point cloud (top half of FIG. 3). Similarly, for each point in the second EGI segment, controller 250 may determine the corresponding point in the second 3D point cloud (top half of FIG. 3). Having located the corresponding points in the first or second point clouds, controller 250 may retrieve the x, y, and z coordinates for those points in the first and second point clouds. By ignoring the z coordinates for those points, each of the points may be projected onto an X-Y 2D plane based on their respective x and y coordinates. For example, if a certain point in the first EGI segment has a corresponding point (x=16, y=19, z=20) in the first point cloud, the point may be mapped onto the 2D plane with coordinates (16, 19). An exemplary projection is illustrated in FIG. 5 where the blue points are points from the white/first point cloud and the red points are from the red/second point cloud.

Next, controller 250 may determine a distribution map for each of the first and second EGI segments in S305. As discussed earlier with reference to FIGS. 6 and 7, controller 250 may generate an N×M grid with each grid point as a bin or bucket. Having generated the N×M grid, controller 250 may distribute each of the points in the 2D plane (FIG. 5) across the N×M grid. To distribute a point present in the 2D plane, controller 250 may determine the x and y coordinates of the point in the 2D plane illustrated in FIG. 5. Each point from the 2D plane may be assigned a value of 1 and this value may be distributed across the different buckets or grid points based on the x and y coordinates of the point, as discussed earlier.

Having calculated in S305 the first and second distribution maps for the first and second EGI segments, respectively, controller 250 may determine in S306 a correlation between the distribution maps over a plurality of rotations. In S306, controller 250 may rotate the second distribution map by a predetermined value (in degrees). Next, controller 250 may take a correlation between the rotated second distribution map and the first distribution map. The correlation may be obtained using a known method such as a Fast Fourier Transform (FFT). Controller 250 may then shift the rotated second distribution map laterally by, for example, shifting the x and y coordinates of the rotated second distribution map. Controller 250 may again determine a correlation between the shifted map and the first distribution map. Controller 250 may then again shift the x and y coordinates of the rotated distribution map and take another correlation. By iterating this process, for a given rotation value, controller 250 may determine a correlation map that maps correlation values with the amount of lateral shift. An exemplary correlation map is shown in FIG. 8. In the correlation map of FIG. 8, the x and y coordinates refer to the amount of shift for the rotated second distribution map. In the correlation map, the z-axis denotes the correlation value for any given lateral shift. Next, controller 250 may rotate the original second distribution map by another rotation value and determine a corresponding correlation map for the rotation value as discussed above. Accordingly, controller 250 may determine a plurality of correlation maps for a plurality of rotation values.

In S307, controller 250 may determine lateral displacement and angular orientation change of machine 100 using the correlation maps. The rotation value corresponding to the correlation map with the highest correlation value may provide the yaw for machine 100. For example, the correlation map of FIG. 8 corresponds to a rotation of 9.2 degrees, which controller 250 may determine as the yaw of machine 100. The x and y coordinates, scaled by an appropriate scaling value, of the location of the peak in the selected correlation map may provide the lateral displacement of machine 100 in the x and y directions. By utilizing the lateral displacement, controller 250 may determine the velocity of machine 100 based on the time difference between the first point cloud and the second point cloud, which is known to controller 250. The process may continue to repeat in this manner until receiving instructions to stop or until new data ceases to be collected from the machine 100.

While the above algorithm was described with reference to the calculation of yaw for machine 100, the algorithm may be modified to calculate roll and pitch either separately or together with yaw. For example, to determine pitch, controller 250 may determine in S303 the first and second EGI segments by filtering using 'y' threshold values as opposed to 'z' threshold values. An exemplary filtering criterion may be $-0.2<y<0.2$. Having determined the first and second EGI segments, in S304, controller 250 may project the points in the EGI segments onto a 2D plane using the x and z coordinate values of the points from the first and second point clouds. That is, instead of creating a 2D map using x and y coordinate values as shown in FIG. 5, controller 250 may create a 2D map using x and z coordinate values. Similarly, in S305, the first and second distribution maps be generated using the x and z coordinate values as opposed to x and y coordinate values. With respect to rotation of the distribution maps in S306, the x and z coordinates may be shifted to determine correlation maps for different rotation values. Like the calculation for yaw, in S307, the rotation corresponding to the highest correlation value may correspond to the pitch. For calculating roll, a similar process may be followed except that the filtering criterion would be based on the x coordinate, and the y and z coordinate values may be used for the 2D planes and subsequent steps.

While the exemplary methods and processes may be described herein as a series of steps, it is to be understood that the order of the steps may be varied. In particular, non-dependent steps may be performed in any order, or in parallel.

The disclosed exemplary embodiments may allow for a faster, more robust, and more accurate registration technique for 3D point clouds in comparison with prior art techniques. Unlike certain prior art techniques, the disclosed motion estimation system may determine lateral displacement between the point clouds and hence, may provide the ability to determine velocity of the machine. Further, the disclosed techniques may not be highly reliant on object characteristics and hence, may be applicable when the detected objects are uniform in all directions, such as a ball.

It will be apparent to those skilled in the art that various modifications and variations can be made to the disclosed motion estimation system. Other embodiments will be apparent to those skilled in the art from consideration of the specification and practice of the disclosed motion estimation system. It is intended that the specification and examples be considered as exemplary only, with a true scope being indicated by the following claims and their equivalents.

What is claimed is:

1. A computer-implemented method of estimating motion of a machine, comprising: determining, by one or more computer processors, a first point cloud and a second point cloud corresponding to an environment in a vicinity of the machine; generating, by the one or more computer processors, a first extended gaussian image (EGI) for the first point cloud and a second EGI for the second point cloud; determining, by the one or more computer processors, a first EGI segment based on the first EGI and a second EGI segment based on the second EGI; determining, by the one or more computer processors, a first two dimensional distribution for points in the first EGI segment and a second two dimensional distribution for points in the second EGI segment; and estimating, by the one or more computer processors, motion of the machine based on the first and second two dimensional distributions; wherein the first EGI segment and the second EGI segment is a subset of points in the first EGI and the second EGI obtained by filtering the points in the first EGI and the second EGI using a predefined criterion; wherein the filtering includes:

defining a first threshold value and a second threshold value for a first coordinate axis, the first threshold value greater than the second threshold value; and filtering out points in the first and second EGI whose coordinate value for the first coordinate axis is greater than the first threshold value and less than the second threshold value.

2. The computer-implemented method of claim 1, wherein the first EGI is generated by taking a norm of each point in the first point cloud and the second EGI is generated by taking a norm of each point in the second point cloud.

3. The computer-implemented method of claim 1, wherein estimating motion of the machine includes:

determining a first distribution map based on the first two dimensional distribution and a second distribution map based on the second two dimensional distribution; and rotating the second distribution map by a plurality of rotation values and taking a correlation between the first distribution map and rotated second distribution map to generate a correlation map for each of the plurality of rotation values.

4. The computer-implemented method of claim 3, wherein generating a correlation map includes:

laterally shifting the rotated second distribution map for a plurality of shift values; and for each of the shift values, calculating a correlation between the rotated second distribution map and the first distribution map.

5. The computer-implemented method of claim 3, wherein estimating motion of the machine further includes estimating an angular orientation and lateral displacement of the machine based on the correlation maps.

6. A system for estimating motion of a machine, comprising:

a perception sensor configured to generate a first point cloud and a second point cloud corresponding to an environment in a vicinity of the machine; and a controller in communication with the perception sensor, the controller configured to:

generate a first extended Gaussian image (EGI) for the first point cloud and a second EGI for the second point cloud;

determine a first EGI segment based on the first EGI and a second EGI segment based on the second EGI;

determine a first two dimensional distribution for points in the first EGI segment and a second two dimensional distribution for points in the second EGI segment; and estimate motion of the machine based on the first and second two dimensional distributions; wherein the first EGI segment and the second EGI segment is a subset of points in the first EGI and the second EGI obtained by filtering the points in the first EGI and the second EGI using a predefined criterion; wherein the filtering includes:

defining a first threshold value and a second threshold value for a first coordinate axis, the first threshold value greater than the second threshold value; and filtering out points in the first and second EGI whose coordinate value for the first coordinate axis is greater than the first threshold value and less than the second threshold value.

7. The system of claim 6, wherein the controller is configured to generate the first EGI by taking a norm of each point in the first point cloud and the second EGI by taking a norm of each point in the second point cloud.

8. The system of claim 6, wherein the controller is configured to estimate motion of the machine by:

determining a first distribution map based on the first two dimensional distribution and a second distribution map based on the second two dimensional distribution; and rotating the second distribution map by a plurality of rotation values and taking a correlation between the first distribution map and rotated second distribution map to generate a correlation map for each of the plurality of rotation values.

9. The system of claim 8, wherein generating a correlation map includes:

laterally shifting the rotated second distribution map for a plurality of shift values; and for each of the shift values, calculating a correlation between the rotated second distribution map and the first distribution map.

10. The system of claim 8, wherein estimating motion of the machine further includes estimating an angular orientation and lateral displacement of the machine based on the correlation maps.

11. A non-transitory computer-readable storage medium storing instructions for enabling a processor to execute a method of estimating motion of a machine, the method comprising:

determining a first point cloud and a second point cloud corresponding to an environment in a vicinity of the machine;

generating a first extended gaussian image (EGI) for the first point cloud and a second EGI for the second point cloud;

determining a first EGI segment based on the first EGI and a second EGI segment based on the second EGI;

determining a first two dimensional distribution for points in the first EGI segment and a second two dimensional distribution for points in the second EGI segment; and estimating motion of the machine based on the first and second two dimensional distributions; wherein the first EGI segment and the second EGI segment is a subset of points in the first EGI and the second EGI obtained by filtering the points in the first EGI and the second EGI using a predefined criterion; wherein the filtering includes:

defining a first threshold value and a second threshold value for a first coordinate axis, the first threshold value greater than the second threshold value; and filtering out points in the first and second EGI whose coordinate value for the first coordinate axis is greater than the first threshold value and less than the second threshold value.

12. The non-transitory computer-readable storage medium of claim 11, wherein the first EGI is generated by taking a norm of each point in the first point cloud and the second EGI is generated by taking a norm of each point in the second point cloud.

13. The non-transitory computer-readable storage medium of claim 11, wherein estimating motion of the machine includes:
   determining a first distribution map based on the first two dimensional distribution and a second distribution map based on the second two dimensional distribution; and
   rotating the second distribution map by a plurality of rotation values and taking a correlation between the first distribution map and rotated second distribution map to generate a correlation map for each of the plurality of rotation values.

14. The non-transitory computer-readable storage medium of claim 13, wherein estimating motion of the machine further includes estimating an angular orientation and lateral displacement of the machine based on the correlation maps.

\* \* \* \* \*